(12) United States Patent
Narasimha et al.

(10) Patent No.: US 9,392,615 B2
(45) Date of Patent: Jul. 12, 2016

(54) METHODS AND DEVICES FOR ALLOCATING RESOURCES IN DEVICE-TO-DEVICE COMMUNICATION

(71) Applicant: Google Technology Holdings LLC, Mountain View, CA (US)

(72) Inventors: Murali Narasimha, Lake Zurich, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 165 days.

(21) Appl. No.: 14/038,991

(22) Filed: Sep. 27, 2013

(65) Prior Publication Data

US 2015/0055567 A1 Feb. 26, 2015

Related U.S. Application Data

(60) Provisional application No. 61/867,826, filed on Aug. 20, 2013.

(51) Int. Cl.
*H04W 4/00* (2009.01)
*H04W 72/12* (2009.01)
*H04W 76/02* (2009.01)
*H04W 84/18* (2009.01)

(52) U.S. Cl.
CPC ........ *H04W 72/1278* (2013.01); *H04W 76/023* (2013.01); *H04W 84/18* (2013.01)

(58) Field of Classification Search
CPC .... H04W 28/18; H04W 72/121; H04W 84/18
See application file for complete search history.

(56) References Cited

U.S. PATENT DOCUMENTS

| 6,700,867 | B2 | 3/2004 | Classon et al. |
| 7,012,949 | B2 | 3/2006 | Uesugi |
| 7,603,464 | B2* | 10/2009 | White ..................... H04L 67/16 709/226 |
| 7,849,203 | B2* | 12/2010 | Berkey .............. H04L 29/08846 709/204 |
| 8,040,815 | B2 | 10/2011 | Silk et al. |
| 8,068,454 | B2 | 11/2011 | Bonta et al. |
| 8,248,959 | B2 | 8/2012 | Olexa |
| 2008/0310363 | A1 | 12/2008 | McBeath et al. |

(Continued)

FOREIGN PATENT DOCUMENTS

| EP | 2395692 A2 | 12/2011 |
| WO | 2009118595 A2 | 10/2009 |
| WO | 2010082084 A1 | 7/2010 |
| WO | 2012047457 A1 | 4/2012 |

OTHER PUBLICATIONS

Fodor, Gábor, et al. "Design aspects of network assisted device-to-device communications." Communications Magazine, IEEE 50.3 (2012): 170-177.

(Continued)

*Primary Examiner* — Dang Ton
*Assistant Examiner* — Ryan Kavleski
(74) *Attorney, Agent, or Firm* — Faegre Baker Daniels LLP

(57) ABSTRACT

This disclosure sets forth methods and devices for allocating resources in Device-to-Device ("D2D") communications in which a base station sends a control message containing a D2D resource allocation (e.g., the identity of resource blocks and subframes that can be used for D2D) and a bitmap. The bitmap contains grant-indicator bits that tell each mobile station within the D2D group whether it is permitted to receive or transmit using the allocated D2D resources.

18 Claims, 5 Drawing Sheets

(56) References Cited

U.S. PATENT DOCUMENTS

| | | | |
|---|---|---|---|
| 2008/0320353 | A1 | 12/2008 | Blankenship et al. |
| 2009/0016229 | A1* | 1/2009 | Wu et al. ............... 370/252 |
| 2009/0180034 | A1 | 7/2009 | Treigherman |
| 2009/0232050 | A1 | 9/2009 | Shen et al. |
| 2010/0050034 | A1 | 2/2010 | Che et al. |
| 2010/0149813 | A1 | 6/2010 | Powell |
| 2011/0188485 | A1 | 8/2011 | Fodor et al. |
| 2011/0282989 | A1* | 11/2011 | Geirhofer et al. ............ 709/224 |
| 2012/0093098 | A1 | 4/2012 | Charbit et al. |
| 2014/0038653 | A1* | 2/2014 | Mildh ............... H04W 28/048 455/501 |
| 2014/0094183 | A1* | 4/2014 | Gao et al. ............... 455/450 |

OTHER PUBLICATIONS

Doppler, Klaus, et al. "Device-to-device communication as an underlay to LTE-advanced networks." Communications Magazine, IEEE 47.12 (2009): 42-49.

Lei, Lei, et al. "Operator controlled device-to-device communications in LTE-advanced networks." Wireless Communications, IEEE 19.3 (2012): 96-104.

3GPP TSG RAN #65, R1-111863, Change Request on "Rate coaching parameters for CA" NTT DoCoMo et al., Barcelona, Spain May 9-13, 2011, all pages.

European Patent Office, International Search Report and Written Opinion for PCT Application No. PCT/2014/051864, mailed Dec. 5, 2014 (12 pages).

* cited by examiner

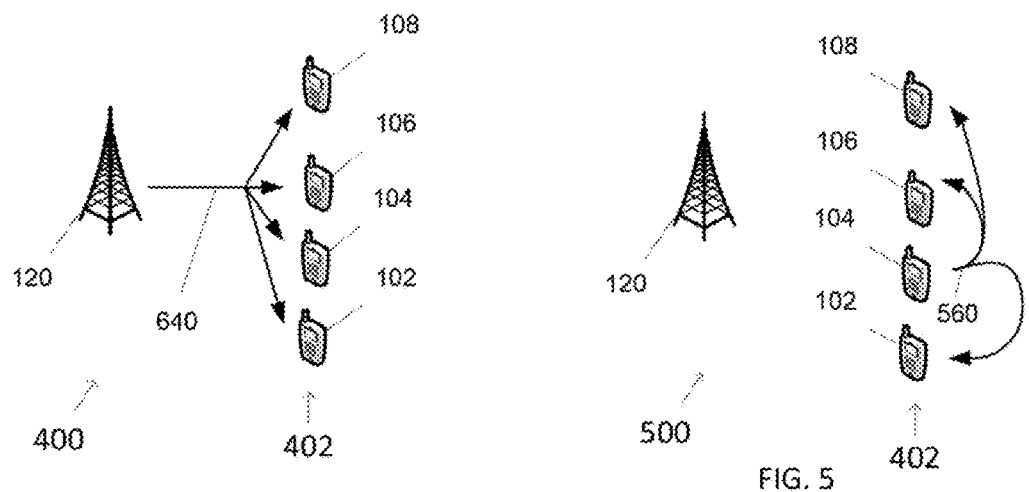
FIG. 4
FIG. 5
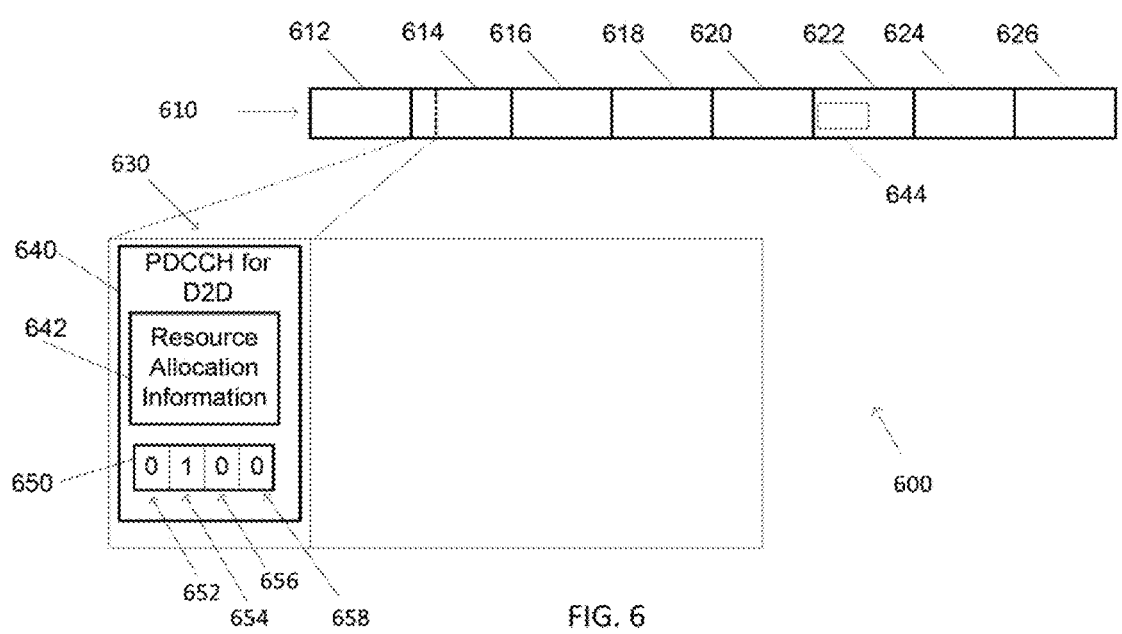
FIG. 6

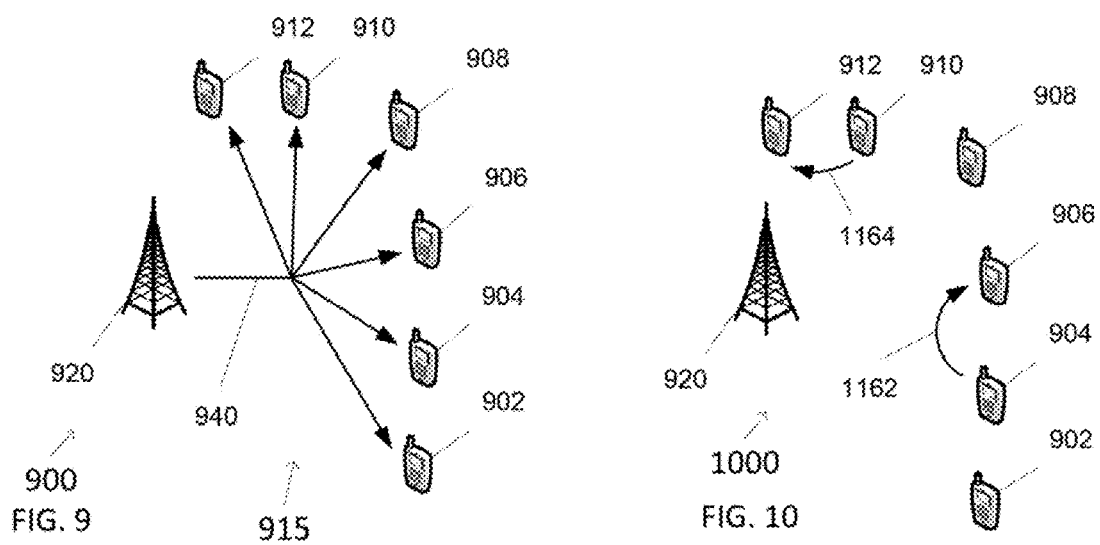
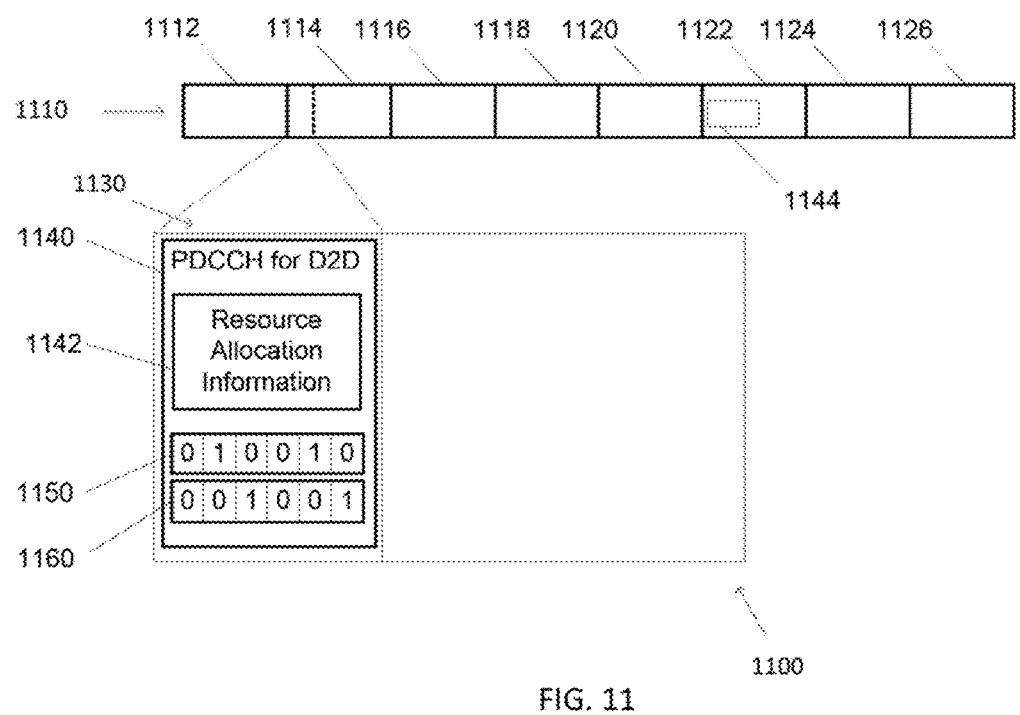

METHODS AND DEVICES FOR ALLOCATING RESOURCES IN DEVICE-TO-DEVICE COMMUNICATION

CROSS-REFERENCE TO RELATED APPLICATIONS

The present application claims priority to U.S. Provisional Patent Application 61/867,826, filed Aug. 20, 2013.

TECHNICAL FIELD

The present disclosure is related generally to wireless network communication and, more particularly, to resource allocation for device-to-device communication in wireless networks.

BACKGROUND

Device-to-Device ("D2D") communication allows wireless mobile stations to communicate directly with one another with minimal use of network resources. To set up a typical D2D communication session in a Long-Term Evolution ("LTE") network, the enhanced Node B ("eNB") identifies a pair of mobile stations, allocates radio network resources (e.g., a portion of the cellular spectrum, which can be expressed in terms of sets of resource blocks ("RBs") in specific subframes) to the devices, and broadcasts information about the allocated radio network resources. Using the allocated resources, the mobile stations can transmit and receive data between themselves without the need for the eNB to relay the data.

Current D2D communication schemes require resource allocation to be performed independently for each device in a pair or a group. This approach can result in inefficiencies because it requires the eNB to send a separate control message to each individual mobile station to let it know which RBs to use for D2D communication. Sending separate control messages increases signaling overhead for the eNB.

One way to address this problem is to allocate D2D resources well in advance and on a long-term basis. Doing so, however, significantly reduces the amount of control the eNB (and hence the network operator) can exercise over the mobile stations. For example, once mobile stations are able to synchronize with one another, they can use the allocated D2D resources and disregard any limitations imposed by the eNB.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 4 is a block diagram of a base station of FIG. 1 with mobile stations of FIG. 1 as members of a device-to-device group, illustrating reception of a control message;

FIG. 5 is another simplified schematic of the base station of FIG. 1 with the mobile stations of FIG. 1 as members of the device-to-device group, illustrating transmission to the device-to-device group;

FIG. 6 is a block diagram that illustrates a sequence of subframes for the base station and the control message of FIG. 4;

FIG. 9 is a block diagram of a base station with mobile stations as members of another device-to-device group, illustrating reception of a control message;

FIG. 10 is another block diagram of the base station and mobile stations of FIG. 9, illustrating transmission to the device-to-device group;

FIG. 11 is a block diagram that illustrates a sequence of subframes for the base station and the control message of FIG. 9.

DETAILED DESCRIPTION

Figure 1:
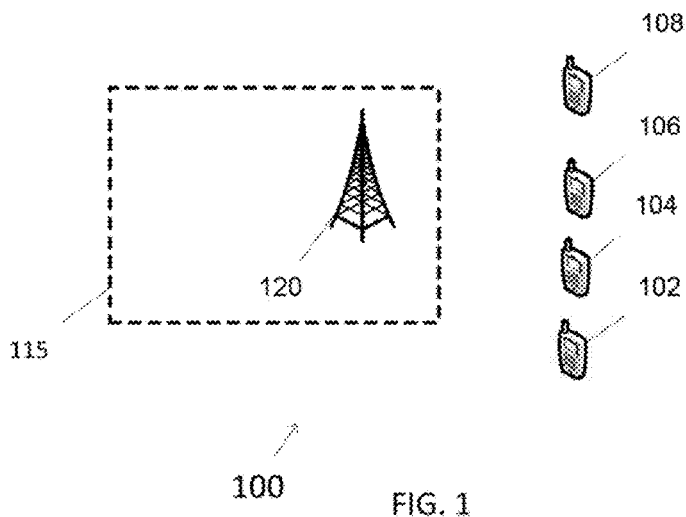
FIG. 1 is an overview of a representative communication system in which the methods of this disclosure may be practiced.

Turning to the drawings wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The various embodiments described herein allow a base station to send a single control message to all of the members of the D2D group, with the individual D2D resource allocations being encoded within the control message. This technique helps to reduce the number of control messages used by the base station for D2D communication sessions while still providing the base station with sufficient control over D2D activities.

According to an embodiment of the disclosure, the base station sends a control message to a D2D group. The control message contains a D2D resource allocation (e.g., the identity of RBs and subframes that can be used for D2D) and a bitmap. The bitmap contains grant-indicator bits that tell each mobile station within the D2D group whether it is permitted to receive or transmit using the allocated D2D resources.

In one embodiment, the control message is encoded with a Radio Network Temporary Identifier ("RNTI").

Turning to FIG. 1, a block diagram 100 illustrates mobile stations 102, 104, 106, 108 and a wireless network 115. The mobile stations 102, 104, 106, 108 are configured for D2D communication with other D2D-enabled devices. The mobile stations 102, 104, 106, 108 are also configured for communication with the wireless network 115 via a base station 120. Possible implementations of each mobile station include a mobile phone (e.g., smartphone), a tablet computer, a laptop, or other computing device. In one embodiment, the wireless network 115 is a cellular (e.g., LTE) network.

Figure 2:
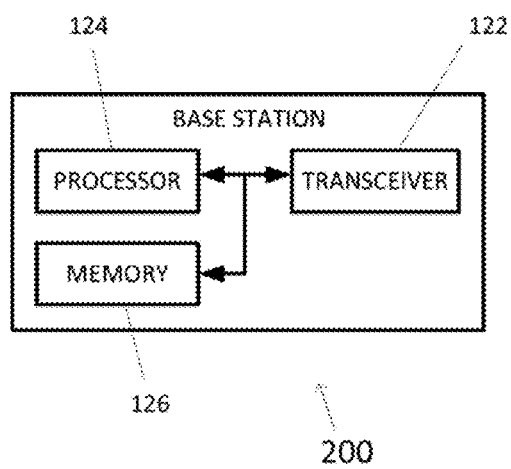
FIG. 2 is a generalized schematic of a representative network entity.

Turning to FIG. 2, a block diagram 200 illustrates an embodiment of a base station such as the base station 120 of FIG. 1. Possible implementations of the base station include an Evolved Universal Terrestrial Radio Access base station, an eNB, a transmission point, a Remote Radio Head, a home eNB, and a femtocell. In one example, the base station is an eNB that controls a macrocell of the wireless network 115. The base station may include multiple network entities. For example, the base station may in fact be two or more base stations operating in conjunction with one another to operate as a single base station or network entity. The base station may also be a portion of another network entity.

The base station includes a transceiver 122, which is configured to transmit data to and receive data from other devices such as the mobile stations 102, 104, 106, 108. The base station also includes at least one memory 126 and a processor 124 that executes programs stored in the memory 126. The processor 124 writes data to and reads data from the memory 126. During operation, the transceiver 122 receives data from the processor 124 and transmits radio-frequency ("RF") signals representing the data. Similarly, the transceiver 122 receives RF signals, converts the RF signals into appropriately formatted data, and provides the data to the processor 124. The processor 124 retrieves instructions from the memory 126 and, based on those instructions, provides outgoing data to, or receives incoming data from, the transceiver 122.

The base station is configured to allocate radio resources (e.g., frames, sub-frames, resource blocks, uplink carriers, downlink carriers, subcarriers) for mobile stations, such as the mobile stations 102, 104, 106, 108. The radio resources can be allocated for communication between a mobile station and the base station or between two or more mobile stations engaged in D2D communication. The base station is configured to generate a control message for two or more mobile stations that indicates an allocated radio resource for the D2D communication between the two or more mobile stations. The control message indicates whether the mobile stations should transmit or receive using the allocated radio resource, as described herein.

Figure 3:
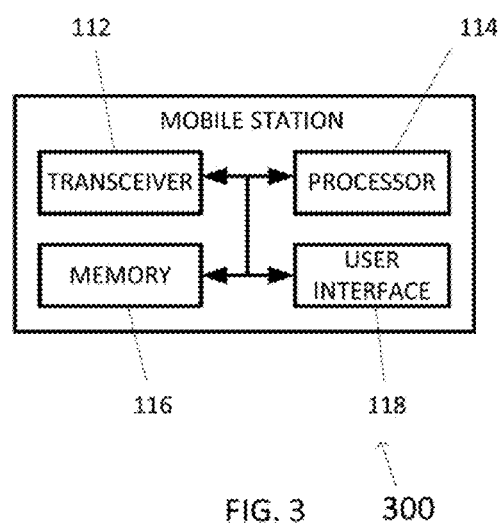
FIG. 3 is a generalized schematic of a representative mobile station.

Turning to FIG. 3, a block diagram 300 depicts a possible implementation of the mobile stations of FIG. 1. The mobile station includes a transceiver 112 configured to transmit data to and receive data from other devices such as the base station 120 or other D2D devices. The mobile station also includes a processor 114 that executes stored programs and at least one memory 116. The processor 114 writes data to and reads data from the memory 116. The mobile station includes a user interface 118 having a keypad, display screen, touch screen, microphone, speaker, or the like. During operation, the transceiver 112 receives data from the processor 114 and transmits RF signals representing the data. Similarly, the transceiver 112 receives RF signals, converts the RF signals into appropriately formatted data, and provides the data to the processor 114. The processor 114 retrieves instructions from the memory 116 and, based on those instructions, provides outgoing data to, or receives incoming data from, the transceiver 112.

In an embodiment, the user interface 118 displays the output of various application programs executed by the processor 114. The user interface 118 additionally includes on-screen buttons that the user can press in order to cause the mobile station to respond. The content shown on the user interface 118 is generally provided to the user interface at the direction of the processor 114. Similarly, information received through the user interface 118 is provided to the processor 114, which may then cause the mobile station to carry out a function whose effects may or may not necessarily be apparent to a user.

Turning to FIGS. 4 and 5, a block diagram 400 (FIG. 4) and a block diagram 500 (FIG. 5) depict the mobile stations 102, 104, 106, 108 as members of a D2D group 402 for a D2D communication session according to an embodiment. Referring to FIG. 6, a block diagram 600 illustrates a sequence 610 of subframes for use by a base station (e.g., the base station 120) for setting up the D2D communication of FIGS. 4 and 5, according to an embodiment. The sequence 610 of subframes includes subframes 612, 614, 616, 618, 620, 622, 624, and 626.

Figure 7:
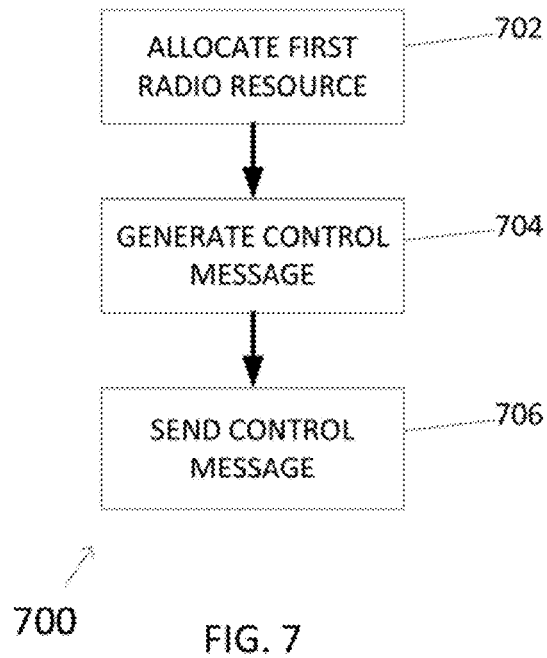
FIG. 7 is a flowchart of a method carried out by the base station of FIG. 1.

Turning to FIG. 7, a flowchart 700 illustrates steps carried out by a base station (e.g., the base station 120) for controlling the D2D communication session of FIGS. 4 and 5, according to an embodiment.

In the embodiment shown, the mobile station 104 has data to be transmitted to the other mobile stations of the D2D group 402 during the D2D communication session. The base station 120 allocates (702) a first radio resource for the D2D group 402. As described above, the first radio resource (e.g., the allocated radio resource) may include one or more of a frame, sub-frame, resource block, uplink carrier, downlink carrier, or subcarrier. In one example, the first radio resource includes a set of resource blocks for the D2D communication session. In another example, the base station 120 allocates the first radio resource on an uplink carrier of the base station 120 used for communication between the base station 120 and mobile stations (e.g., the mobile stations 102, 104, 106, 108). In the example described, the first radio resource corresponds to the sub-frame 622.

Referring to FIGS. 6 and 7, the base station 120 generates (704) a control message 640 for the mobile stations 102, 104, 106, 108 (e.g., for the D2D group 402). The control message 640 indicates the first radio resource allocated for the D2D group 402. As shown in FIG. 6, the control message 640 includes resource allocation information 642 that indicates the allocation of the first radio resource. For example, the resource allocation information 642 can allocate a radio resource 644 in subframe 622. The control message 640 also indicates which mobile stations of the D2D group 402 should transmit or receive using the first radio resource. For example, the control message 640 includes grant-indication information for each mobile station of the D2D group 402. Accordingly, the control message 640 provides a single message that can be sent to each of the mobile stations of the D2D group 402 for the D2D communication session.

The control message 640 includes grant-indication information (e.g., a grant indicator) that indicates whether the mobile station should transmit to another mobile station or receive from another mobile station. In the example shown in FIG. 6, the grant indicator is a bitmap 650 with four bits 652, 654, 656, 658 corresponding to mobile stations 102, 104, 106, 108, respectively. A value of each bit of the bitmap 650 thus indicates whether to transmit or receive. In the example shown in FIG. 6, a transmit value is equal to "1," and a receive value is equal to "0." The transmit value and receive value may be reversed (e.g., "0" and "1," respectively) in other embodiments. In the example shown in FIG. 6, the base station 120 sets the bits 652, 656, 658 to "0" to indicate that the mobile stations 102, 106, 108 should receive using the first radio resource. The base station 120 sets the bit 654 to "1" to indicate that the mobile station 104 should transmit using the first radio resource. While a bitmap is shown in FIG. 6 for the grant indicator, other data formats will be apparent to those skilled in the art.

The base station 120 sends (706) the control message 640 to the mobile stations 102, 104, 106, 108 in the sub-frame 614. In the example shown in FIG. 6, the base station 120 transmits the control message 640 to the mobile stations 102, 104, 106, 108 in a control channel 630 of the sequence 610 of subframes. As shown in FIG. 6, the control channel 630 is a physical downlink control channel ("PDCCH"), for example, resource blocks designated in the sequence 610 as control information for the PDCCH. The control channel 630 in this case may include other information, such as resource allocation format, reference signals, or power control information. In other embodiments, the control channel 630 is another control or messaging channel.

Control messages transmitted over the PDCCH are typically encoded or scrambled using an identifier associated with the mobile station that should receive the control message, such as an RNTI. In the embodiment described herein, instead of using an RNTI that corresponds to only a single mobile station that should receive the control message 640, the base station 120 encodes the control message 640 using an identifier for the D2D group 402, such as a Group-RNTI. The control message 640 is thus addressed to the entire D2D group 402. In another embodiment, the base station 120 uses an RNTI for a mobile station of the D2D group 402 to encode the control message 640. For example, the base station 120 uses an RNTI for the mobile station 104 (e.g., a Cell-RNTI) to represent the D2D group 402 and communicates that RNTI to the other mobile stations of the D2D group 402 prior to the control message 640. In this case, the control message 640 indicates the identifier of the mobile station 104. The other mobile stations (e.g., mobile stations 102, 106, 108) then use the RNTI of the mobile station 104 for decoding the control message 640.

After receiving the control message 640, the mobile stations 102, 104, 106, 108 transmit or receive, as indicated by the control message 640, using the first radio resource. As shown in FIG. 5, the mobile station 104 transmits data 560 to the mobile stations 102, 106, 108 using the first radio resource within the sub-frame 622.

In alternative embodiments, the base station 120 allocates the first radio resource using a medium access control ("MAC") layer message, radio resource control ("RRC") layer message, or other higher layer message (i.e., above the physical layer). For example, a MAC or RRC layer message may allow a larger size of the control message 640. In this case, the resource allocation information 642 may include additional allocation information, such as a schedule (e.g., a round-robin or other technique) for transmission and reception for a set of periodic resources allocated for the D2D group 402.

In another embodiment, the mobile station 102 determines that it has an uplink transmission for the base station 120 in a radio resource that overlaps a radio resource that the base station 120 has allocated to the mobile station 102 for D2D communication with another mobile station. In this case, the mobile station 102 prioritizes the uplink transmission to the base station 120 over the D2D transmission to the other mobile stations. Examples of the uplink transmission include a hybrid automatic repeat request acknowledgement sent on a physical uplink control channel, a sounding reference symbol transmission, or a physical uplink shared channel transmission in response to an uplink grant.

Figure 8:
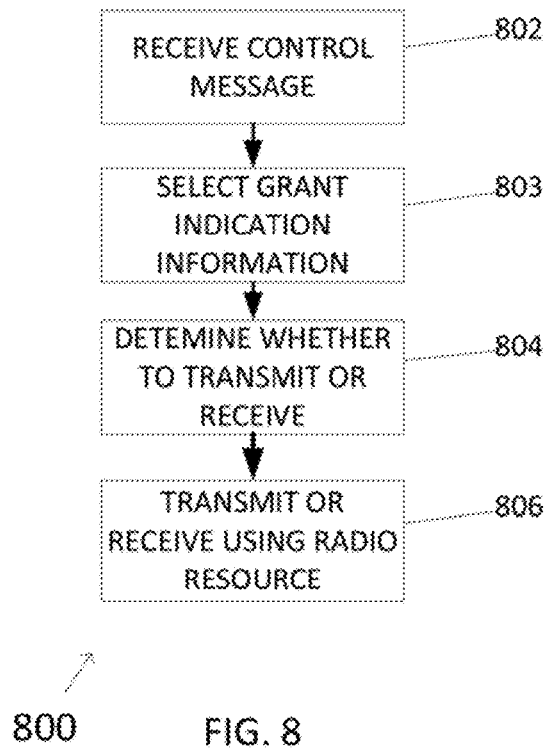
FIG. 8 is a flowchart of a method carried out by a mobile station of FIG. 1.

Turning to FIG. 8, a flowchart 800 illustrates a method in a mobile station (e.g., the mobile station 104) for the D2D communication session of FIGS. 4 and 5, according to an embodiment. The mobile station 104 receives (802) a control message from the base station 120, for example the control message 640. Upon reception (802), the mobile station 104 in one example decodes the control message 640 based on a group identifier for the D2D group 402. As described above, the group identifier may be a Group-RNTI or the Cell-RNTI of a selected member of the D2D group 402. In the latter case, the mobile station 104 uses a previously received Cell-RNTI to decode the control message 640.

As described above with reference to FIGS. 4, 5, and 6, the control message 640 indicates the radio resource of the base station 120 allocated for the D2D group 402. The control message 640 further indicates a first grant-indicator bit (e.g., bit 654) that indicates whether the mobile station 104 should transmit or receive using the allocated radio resource. The control message 640 also includes second grant-indicator bits (e.g., bits 652, 656, 658) that indicate whether the mobile stations 102, 106, 108 should transmit or receive using the allocated radio resource. In this case, the mobile station 104 ignores the second grant-indicator bits. The mobile station 104 selects (803) a portion of the grant-indication information (i.e., the bit 654) that corresponds to the mobile station 104.

The mobile station 104 determines (804) whether to transmit or receive using the allocated resource based on the first grant-indicator bit. In this case, the bit 654 has been set to a transmit value of "1," and the mobile station 104 determines that it should transmit using the allocated radio resource. The mobile station 104 transmits or receives (806) based on the determination (804). In this case, the mobile station 104 transmits using the allocated radio resource.

Mobile stations 102, 106, 108 receive (802) the same control message 640. In this case, bits 652, 656, 658 have been set to a receive value of "0," and the mobile stations 102, 106, 108 determine that they should receive using the allocated resource. Accordingly, the mobile stations 102, 106, 108 receive the transmission from mobile station 104 using the allocated radio resource.

Turning to FIGS. 9, 10, and 11, block diagrams 900 and 1000 illustrate mobile stations 902, 904, 906, 908, 910, 912 served by a base station 920 for a D2D communication session according to an embodiment. The mobile stations 902, 904, 906, 908, 910, 912 may be implemented as shown in FIG. 3. The base station 920 may be implemented as shown in FIG. 2. Block diagram 1100 illustrates a sequence 1110 of subframes for a base station (e.g., the base station 920) for the D2D communication of FIGS. 9 and 10, according to an embodiment. The sequence 1110 of subframes includes subframes 1112, 1114, 1116, 1118, 1120, 1122, 1124, 1126.

In the embodiment shown, the mobile station 904 has data for the mobile station 906, and the mobile station 910 has data for the mobile station 912. Due to separation between the mobile stations 904, 906, 910, 912, the mobile stations 904 and 910 may be allowed to transmit using the same radio resource concurrently. For example, a geographic distance or a structure (e.g., a building) that at least partially obstructs communications between the mobile stations sufficiently attenuates a transmission from the mobile stations to prevent interference. In the example shown, the distance between the mobile station 904 and the mobile station 912 and the distance between the mobile station 910 and 906 is sufficient to allow both mobile stations 904 and 910 to transmit their respective data in a D2D communication. In this case, the base station 920 assigns the mobile stations 902, 904, 906, 908, 910, 912 to a D2D group 915.

The base station 920 allocates a first radio resource for the D2D group 915. As described above, the first radio resource (e.g., the allocated radio resource) may include one or more of a frame, sub-frame, resource block, uplink carrier, downlink carrier, or subcarrier. In the example described, the first radio resource corresponds to the sub-frame 1122.

Referring to FIGS. 11 and 7, the base station 920 generates (704) a control message 1140 for the mobile stations 902, 904, 906, 908 (e.g., for the D2D group 915). The control message 1140 indicates the first radio resource allocated for the D2D group 915. As shown in FIG. 11, the control message 1140 includes resource allocation information 1142 that indicates the allocation of the first radio resource. For example, the resource allocation information 1142 can allocate a radio resource 1144 in subframe 1122. The control message 1140 also indicates which mobile stations of the D2D group 915 should transmit or receive using the first radio resource. Accordingly, the control message 1140 provides a single message which can be sent to each of the mobile stations of the D2D group 915 for the D2D communication session.

In contrast to the embodiment shown in FIG. 6, the control message 1140 includes a transmit grant indicator and a receive grant indicator for each mobile station 902, 904, 906, 908, 910, 912 of the D2D group 915. In the example shown in FIG. 11, the transmit grant indicator includes a bitmap 1150 with six bits corresponding to mobile stations 902, 904, 906, 908, 910, 912, respectively. A value of each bit of the bitmap 1150 thus indicates whether to transmit. The receive grant indicator includes a bitmap 1160 with six bits corresponding to mobile stations 902, 904, 906, 908, 910, 912, respectively. In the example shown in FIG. 11, a transmit value is equal to "1," and a receive value is equal to "0." The transmit value and receive value may be reversed (e.g., "0" and "1" respectively) in other embodiments. In the example shown in FIG. 11, the base station 920 sets the bits of the transmit grant indicator 1150 corresponding to the mobile stations 904 and 910 to "1" to indicate that the mobile stations 904 and 910 should transmit using the first radio resource. The base station 920 sets the remaining bits of the transmit grant indicator to "0" to indicate that the other stations should not transmit. The base station 920 sets the bits of the receive grant indicator corresponding to the mobile stations 906 and 912 to "1" to indicate that the mobile stations 906 and 912 should receive using the first radio resource. The base station 920 sets the remaining bits of the receive grant indicator to "0" to indicate that the other stations need not receive.

The base station 920 sends (706) the control message 1140 to the mobile stations 902, 904, 906, 908, 910, 912 in the sub-frame 1114 using a control channel 1130 (e.g., the PDCCH), analogously to the sending of the control message 640. Accordingly, the control message 1140 is addressed to the entire D2D group 915. After receipt of the control message 1140, the mobile stations 902, 904, 906, 908, 910, 912 transmit or receive, as indicated by the control message 1140, using the first radio resource. As shown in FIG. 10, the mobile station 904 transmits data 1162 to the mobile station 906, and the mobile station 910 transmits data 1164 to the mobile station 912 using the first radio resource within the sub-frame 1122. The mobile stations 902 and 908 are idle during the first radio resource. Accordingly, the base station 920 may select a first set of mobile stations for transmitting (e.g., base stations 904 and 910) and a second set of mobile stations for receiving (e.g., base stations 906 and 912).

Figure 12:
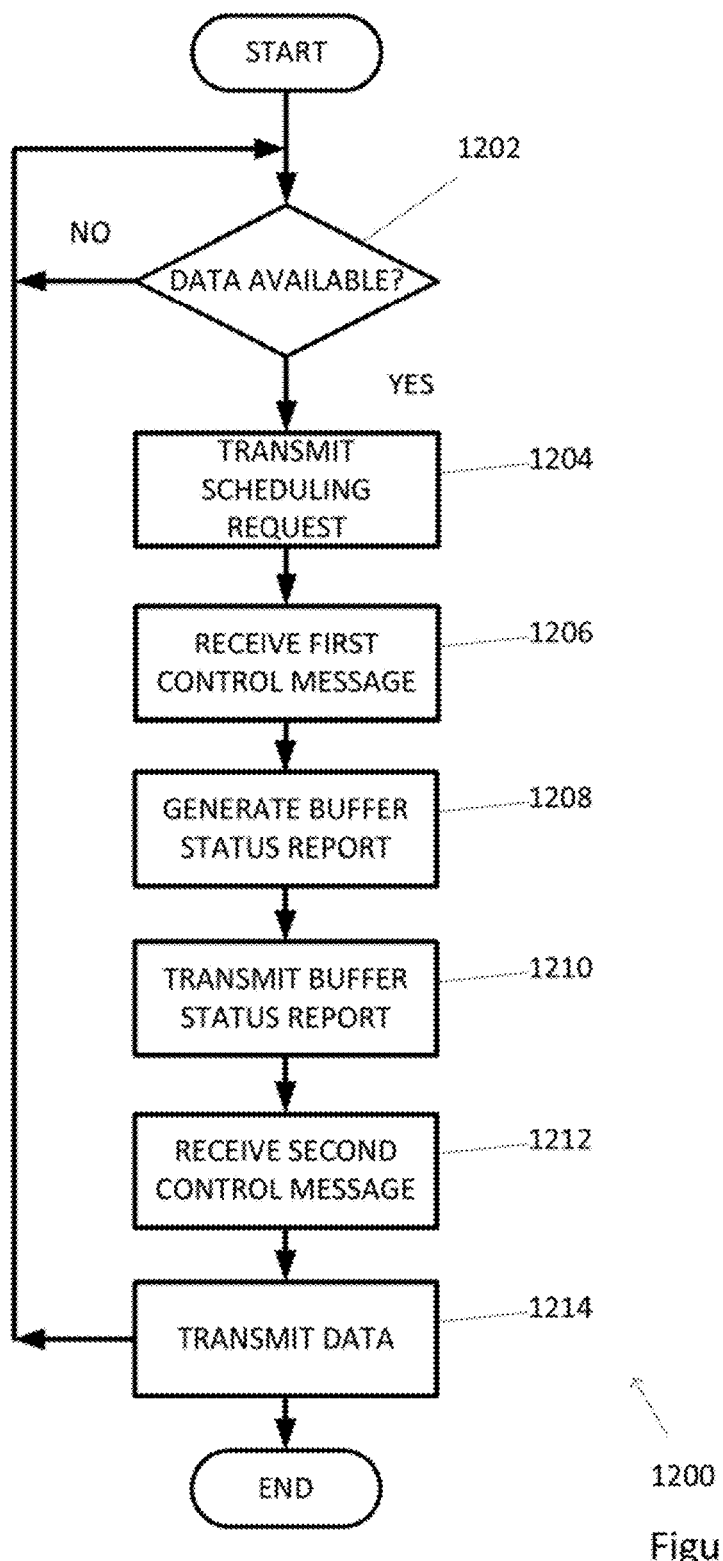
FIG. 12 is a flowchart of a method carried out by a mobile station of FIG. 1.

Turning to FIG. 12, a flowchart 1200 illustrates a method in a mobile station (e.g., the mobile station 104) for requesting a D2D communication session, according to an embodiment. As described above, the base station 120 or 920 may control allocation and management of radio resources. The mobile station 104 is configured to send a D2D request for allocation of radio resources when it has data for transmission through a D2D communication session. The mobile station 104 determines (1202) whether data for direct transmission (e.g., D2D communication) to at least one second mobile station (e.g., the mobile station 106) are available. If data are not available (NO at 1202), the mobile station 104 waits for data. If data are available (YES at 1202), the mobile station 104 transmits (1204) a scheduling request to the base station 120. In response to the scheduling request, the mobile station 104 receives (1206) a first control message from the base station 120 that indicates an uplink grant. The uplink grant in one example corresponds to a grant for a physical uplink shared channel.

In response to the first control message, the mobile station 104 generates (1208) a buffer status report. The buffer status report indicates an amount of the data for direct transmission. In a further example, the buffer status report includes an identifier of a recipient for the data (e.g., the mobile station 106). The buffer status report may include a plurality of identifiers for a plurality of recipient mobile stations or a group identifier, such as the Group-RNTI. The mobile station 104 transmits (1210) the buffer status report based on the uplink grant (e.g., over the physical uplink shared channel) to the base station 120 based on the uplink grant. In response, the base station 120 allocates a first radio resource for a D2D communication session between the mobile stations 104 and 106 and sends a second control message to the mobile station 104. The mobile station 104 receives (1212) the second control message, which indicates the allocation in response to the buffer status report. The second control message in one example is analogous to the control message 640 or 1140. In this case, the second control message indicates that the mobile station 104 should transmit using a first radio resource and that the mobile station 106 should receive using the first radio resource. The mobile station 104 transmits the data to the mobile station 106 according to the D2D grant of the second control message.

Although the various embodiments are frequently described in the context of an LTE cellular system, it is to be understood that the scope of the disclosure is not limited to LTE and may be implemented in other types of wireless networks (Institute of Electrical and Electronics Engineers ("IEEE") 802.11, IEEE 802.16, etc.).

The disclosed embodiments may be described in terms of functional block components and various processing steps. Such functional blocks may be realized by any number of hardware or software components configured to perform the specified functions.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method in a base station of a wireless network, the base station in communication with at least a first mobile station and a second mobile station the method comprising:

allocating, in the base station, a first radio resource for a Device-to-Device ("D2D") group, wherein the D2D group comprises the first mobile station and the second mobile station;

generating, in the base station, a control message, wherein the control message indicates that the first mobile station should transmit using the first radio resource and the second mobile station should receive using the first radio resource, wherein generating the control message comprises:

generating a control message that includes a bitmap, wherein the bitmap incudes a first grant-indicator bit for the first mobile station and a second grant-indicator bit for the second mobile station;

setting the first grant-indicator bit to a transmit vale that indicates that the first mobile station should transmit using the first radio resource; and setting the second grant-indicator bit to a receive value to indicate that the second mobile station should receive using the first radio resource; and sending, by the base station, the control message to the first and second mobile stations.

2. The method of claim 1 wherein the control message includes an allocation for the first radio resource.

3. The method of claim 1 wherein allocating the first radio resource comprises allocating the first radio resource using a medium access control layer message or a radio resource control layer message.

4. The method of claim 1 wherein allocating the first radio resource comprises allocating the first radio resource on an uplink carrier of the base station used for communication between the base station and the first mobile station.

5. The method of claim 1:
wherein generating the control message comprises encoding the control message with a group radio network temporary identity for the D2D group; and
wherein sending the control message comprises sending the encoded control message to the first and second mobile stations on a physical downlink control channel.

6. The method of claim 1 further comprising:
transmitting to the second mobile station a message that indicates an identifier of the first mobile station;
wherein generating the control message comprises encoding the control message with the identifier of the first mobile station; and
wherein sending the control message comprises sending the encoded control message to the first and second mobile stations on a physical downlink control channel.

7. The method of claim 1:
wherein the D2D group comprises a first set of mobile stations and a second set of mobile stations, wherein the first set of mobile stations includes the first mobile station, wherein the second set of mobile stations includes the second mobile station;
wherein the bitmap comprises:
first bitmap and a second bitmap;
wherein the first bitmap includes a transmit grant-indicator bit for each mobile station of the first and second sets of mobile stations; and
wherein the second bitmap includes a receive grant-indicator bit for each mobile station of the first and second sets of mobile stations;
wherein setting the first grant-indicator bit to the transmit value that indicates that the first mobile station should transmit using the first radio resource comprises setting the corresponding transmit grant-indicator bit, for each mobile station of the first set of mobile stations, to a transmit value that indicates that the corresponding mobile station should transmit using the first radio resource; and
wherein setting the second grant-indicator bit to the receive value to indicate that the second mobile station should receive using the first radio resource comprises setting the corresponding receive grant-indicator bit, for each mobile station of the second set of mobile stations, to a receive value that indicates that the corresponding mobile station should receive using the first radio resource; and
wherein sending the control message comprises sending the control message to the first and second set of mobile stations.

8. A base station of a wireless network, the base station comprising:
a processor; and
a non-transitory memory;
wherein the base station is configured to allocate a first radio resource for a Device-to-Device ("D2D ") group;
wherein the D2D group comprises a first mobile station and a second mobile station;
wherein the base station is configured to generate a control message;
wherein the control message indicates that the first mobile station should transmit using the first radio resource;
wherein the control message indicates that the second mobile station should receive using the first radio resource;
wherein the control message includes a bitmap, wherein:
the bitmap includes a first grant-indicator bit for the first mobile station and a second grant-indicator bit for the second mobile station:
wherein the first grant-indicator bit is set to a transmit value that indicates that the first mobile station should transmit using the first radio resource: and
wherein the second grant-indicator bit is set to a receive value to indicate that the second mobile station should receive using the first radio resource; and
wherein the base station is configured to send the control message to the first and second mobile stations.

9. A method in a first mobile station for a wireless network, the method comprising:
determining whether data for direct transmission to at least one second mobile station are available;
transmitting a scheduling request to a base station of the wireless network if data are available;
receiving a first control message from the base station that indicates an uplink grant in response to the scheduling request;
generating a buffer status report that indicates an amount of the data for direct transmission;
transmitting the buffer status report to the base station;
receiving a second control message from the base station indicating a D2D grant in response to the buffer status report,
wherein the second control message indicates a radio resource of the base station allocated for mobile stations of a D2D group that includes the mobile station, grant-indication information that indicates which mobile stations of the D2D group are allowed to transmit using the radio resource and which mobile stations of the D2D group are required to receive using the radio resource. wherein the grant-indication information comprises a bitmap with a grant-indicator bit for each mobile station of the D2D group:
selecting a portion of the grant-indication information that corresponds to the mobile station comprising selecting grant-indicator bit that corresponds to the mobile station:
determining whether to transmit or receive using the radio resource based on the selected portion of the grant-indication information comprising determining whether the selected grant-indicator bit is a transmit value or a receive value,
wherein the second control message indicates that the first mobile station should transmit using the first radio resource, wherein the second control message indicates that the second mobile station should receive using the first radio resource; and transmitting the data to the at least one second mobile station according to the D2D grant of the second control message.

10. The method of claim 9 wherein the buffer status report further indicates an identifier for the at least one second mobile station.

11. The method of claim 9:
wherein the bitmap includes a first grant indicator for the first mobile station, and at least one second grant indicator for the at least one second mobile station; and
wherein the first and the at least one second grant indicators indicate whether to transmit or receive using the allocated radio resource.

12. A method in a mobile station for a wireless network, the method comprising:
receiving a control message from a base station of the wireless network, wherein the control message indicates a radio resource of the base station allocated for mobile stations of a D2D group that includes the mobile station, grant-indication information that indicates which mobile stations of the D2D group are allowed to transmit using the radio resource and which mobile stations of the D2D group are required to receive using the radio resource, wherein the grant-indication information comprises a bitmap with a grant-indicator bit for each mobile station of the D2D group;
selecting a portion of the grant-indication information that corresponds to the mobile station comprising selecting the grant-indicator bit that corresponds to the mobile station;
determining whether to transmit or receive using the radio resource based on the selected portion of the grant-indication information comprises determining whether the selected grant-indicator bit is a transmit value or a receive value; and
transmitting or receiving using the allocated radio resource based on the determination of whether to transmit or receive.

13. The method of claim 12 further comprising decoding the control message based on a group indicator for the D2D group.

14. The method of claim 13:
wherein receiving the control message comprises receiving the control message on a physical downlink control channel; and
wherein decoding the control message comprises decoding the control message with a group radio network temporary identity for the D2D group.

15. The method of claim 13 further comprising:
sending a D2D request to the base station for D2D communication; and
receiving the group indicator in response to the D2D request.

16. The method of claim 12:
wherein receiving the control message comprises receiving the control message on a physical downlink control channel;
the method further comprising decoding the control message with a group radio network temporary identity for the D2D group.

17. The method of claim 12:
wherein the bitmap comprises a first bitmap and a second bitmap, wherein the first bitmap includes a transmit grant-indicator bit for each mobile station of the D2D group;
wherein the second bitmap includes a receive grant indicator for each mobile station of the D2D group;
wherein selecting the portion of the grant-indication information comprises selecting a transmit grant-indicator bit that corresponds to the mobile station and a receive grant-indicator bit that corresponds to the mobile station;
wherein determining whether to transmit or receive comprises determining whether the selected transmit grant-indicator bit is a transmit value and whether the selected receive grant-indicator bit is a receive value; and
wherein transmitting or receiving comprises transmitting if the selected transmit grant-indicator bit is the transmit value and receiving if the selected receive grant-indicator bit is the receive value.

18. The method of claim 12 wherein the control message is a radio resource control message.

* * * * *